United States Patent [19]
Hogden et al.

[11] Patent Number: 6,038,388
[45] Date of Patent: Mar. 14, 2000

[54] ANOMALY ANALYSIS USING MAXIMUM LIKELIHOOD CONTINUITY MAPPING

[75] Inventors: John E. Hogden; James Clinton Scovel, both of Santa Fe; James M. White, Los Alamos, all of N.Mex.

[73] Assignee: Regents of the University of California, Los Alamos, N.Mex.

[21] Appl. No.: 09/015,093

[22] Filed: Jan. 29, 1998

Related U.S. Application Data

[60] Provisional application No. 60/036,065, Jan. 30, 1997.
[51] Int. Cl.[7] .......................... G06F 17/18; G06F 101/14; G06G 7/48
[52] U.S. Cl. ................................. 395/500.27; 395/500.23
[58] Field of Search ......................... 395/500.23, 500.27; 705/2, 3, 11

[56] References Cited

U.S. PATENT DOCUMENTS 5,557,514  9/1996  Seare et al. .................................. 705/2
5,581,655  12/1996  Cohen et al. ........................... 704/245

OTHER PUBLICATIONS

Garner et al.: Hypothesis Generation Paradigm for Fraud Detection; IEEE TENCON '94; pp. 197–201, Aug. 1994.
Robert M. Gray, "Vector Quantization," IEEE ASSP Magazine, Apr. 1984, pp. 4–29.
John Hogden, "A Maximum Likelihood Approach To Estimating Articulator Positions From Speech Acoustics," LA–UR–96–3518, pp. 1–24.

*Primary Examiner*—Kevin J. Teska
*Assistant Examiner*—Hugh Jones
*Attorney, Agent, or Firm*—Ray G. Wilson

[57] ABSTRACT

A method of modeling symbol sequence generation is obtained which allows the probability of symbol sequences to be estimated. The model involves treating symbols as if they are emitted as a point travels through an abstract space called a continuity map (CM), in which each position in the space has associated probabilities of emitting each of the possible symbols. This method for modeling symbol generation, combined with methods for estimating the probability of symbol sequences given smooth paths through the CM, can be applied to such problems as language modeling and anomaly/fraud detection. A fraud detection study is described that demonstrates that the invention can be used for detecting medical fraud.

6 Claims, 6 Drawing Sheets

6,038,388

ANOMALY ANALYSIS USING MAXIMUM LIKELIHOOD CONTINUITY MAPPING

This applications claims the priority benefit of U.S. Provisional Application Ser. No. 60/036,065, filed Jan. 30, 1997.

BACKGROUND OF THE INVENTION

This invention relates to determining the probability of data sequences given the most likely underlying cause of the data sequences, and, more particularly, to modeling data sequences as the output of smooth motion through a continuity map (CM) in which each possible item in the data sequence is produced with some probability from each position in the CM. This invention was made with government support under Contract No. W-7405-ENG-36 awarded by the U.S. Department of Energy. The government has certain rights in the invention.

Determining the probability of data sequences is a difficult problem with several applications. For example, current speech recognition algorithms use language models (which estimate the probability of a sequence of words) to increase recognition accuracy by preventing the programs from outputting nonsense sentences. The grammars that are currently used are typically stochastic, meaning that they are used to estimate the probability of a word sequence—a goal of the present invention. For example, in order to determine the probability of the sentence "the cow's horn honked", an algorithm might use stored knowledge about the probability of "cow's" following "the", "horn" following "cow's", and "honked" following "horn". Grammars such as these are called bigram grammars because they use stored information about the probability of two-word sequences.

Notice that, although cow's horns typically do not honk, a bigram grammar would consider this a reasonable sentence because the word "honk" frequently follows "horn". This problem can be alleviated by finding the probabilities of longer word sequences. A speech recognition algorithm using the probabilities of three-word sequences (trigrams) would be unlikely to output the example sentence because the probability of the sequence "cow's horn honked" is small. Using four, five, six, etc.-word sequences should improve recognition even more. While it is theoretically possible to calculate the probabilities of all three-word sequences or four-word sequences, as the length of the word sequence increases, the number of probabilities that have to be estimated increases exponentially, i.e., if there are N words in the grammar then we need to estimate N*N probabilities for a bigram grammar, N*N*N probabilities for a trigram grammar, etc.

In accordance with the present invention, methods for estimating the likelihood of data sequences are adapted for application to detecting anomalous data sequences, such as fraudulent medical histories or abnormal data from sensors on car engines, nuclear power plants, factories, and the like, indicating a possible malfunction of the sensors or of the engine/power plant/factory. Consider the problem of detecting fraud using large databases of medical histories, in which each patient's medical history is composed of a sequence of medical procedures performed on the patient. Given a large enough collection of medical histories, such as are available at large medical insurance companies or the various medical social services, sufficient statistical information should be present to infer whether the care that is being delivered, and the charges for the care, are normal or are unusual. If a patient's medical history is sufficiently anomalous, the patient's medical history or the physician's record should be further reviewed for evidence of fraud.

As with many problems where estimating the probability of a sequence is required, using the simplest technique for estimating the probability (multiplying the probability of the first symbol by the probability of the second symbol, etc.) would be very inaccurate. One source of inaccuracy is the failure to take into account the order of the symbols. After all, the likelihood of a patient's medical history depends on the order in which the medical treatments are delivered. This can be seen by noting that doctors are likely to perform simple, non-invasive tests before performing more complex and/or invasive tests. Thus, seeing the same set of tests performed in a different order may radically alter an expert's estimate of how probable is a medical history. Since the order of the medical procedures tells a great deal about the probability of the sequence of procedures, many patients who have relatively probable medical histories will look like potential cases of fraud (and thus overburden the fraud detection system) unless the order of the medical procedures is taken into account when evaluating the likelihood of a patient's medical history.

Furthermore, it is often the case that an estimate of the probability of a sequence per se is not wanted, but, rather, the likelihood of a sequence given the most likely underlying cause. To make this idea more concrete, imagine that there are three diseases with the following characteristics:

1. Disease 1 is very common and is always treated with procedure 1A followed by procedure 1B and then procedure 1C.

2. Disease 2 is also common, but is always treated with procedure 2A followed by procedure 2B and then procedure 2C.

3. Disease 3 is very rare and is always treated by procedure 3A followed by procedure 3B and finally procedure 3C.

Now imagine that the following medical history is seen: procedure 1A, procedure 2A, procedure 2C. Although each of the procedures is relatively common, an expert might consider this sequence to be more anomalous than the sequence: procedure 3A, procedure 3B, procedure 3C which is less probable than the first sequence. This discrepancy between the probability of a sequence and the suspiciousness of the sequence is not unreasonable. After all, if the second sequence is seen, it is assumed that the patient had disease 3 and received the normal treatment for that disease. On the other hand, there is no known disease that would cause a physician to perform the first sequence—making it seem suspicious. So the process of determining whether a sequence is anomalous is often something like this: the fraud investigator guesses the likely cause of the sequence and then decides whether the procedures are probable given the most likely cause. If the investigator can find no likely reason for performing a sequence of procedures, then the sequence is considered suspicious.

Thus, for detecting anomalies/fraud, it would be useful to have a technique for evaluating the likelihood of data sequences that takes into consideration the order of the elements in the sequences, and tries to infer the underlying cause of the sequence. However, as with language models, prior art techniques for determining the likelihood of such sequences require estimating many parameters, and typically do not try to estimate the underlying cause.

The invention described herein addresses these problems. After describing the invention, a preliminary experiment that demonstrates the ability of the invention to detect anomalous data sequences is presented.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the process of this invention may comprise a method for estimating the probability of anomalous transactions. A sequence of features is defined to represent the transactions in a transaction space. A mapping is found between known transactions and continuity map (CM) positions of the features using a training data set composed of features representing the known transactions. Sequences of features are determined that form CM paths that maximize the conditional probability of each one of the known transactions. The conditional probability of a subsequent feature sequence forming one of said continuity map and the features are medical procedures used to maintain the health of a system.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

In accordance with one aspect of the present invention, Maximum Likelihood Continuity Mapping (Malcom) uses a training data base composed of sequences of symbols (words, letters, medical procedure codes, etc.) to create a model of sequence generation that can be used to determine the conditional probability of a subsequent sequence of symbols. A mapping is found between symbols and probability density functions (PDFs) over an abstract space called a continuity map. The word mapping, as used herein, is meant in the mathematical sense. Informally, a mapping is a rule that assigns to each object in one set a unique object in another set. Thus a unique probability density function over positions in a continuity map is assigned to each symbol type. Any such mapping (e.g., from medical procedures to probability density functions over a continuity map) will be referred to as a probabilistic mapping. The present invention is directed to a particular probabilistic mapping, referred to hereafter as a maximum likelihood continuity mapping that is used for detecting anomalous transactions. Note the difference between a "mapping" and a "map": "map" refers to an abstract space that may or may not include probability density functions, but a "mapping" defines a relationship two sets.

While "continuity map" is used to designate an abstract space, it is important to realize that positions in the continuity map, and therefore paths through the continuity map are not abstract objects. A path through a d-dimensional continuity map is a d-dimensional time signal that can be transmitted via radiowaves, phone lines, and the like. Similarly, the data sets on which Malcom is used can be represented by sequences of symbols or sequences of codes, but these data sets are formed of physical events (e.g., sound sequences, phoneme sequences, letter sequences, symbol sequences, word sequences, and the like) or sequences of transactions (e.g., medical procedures, financial transactions, and the like).

As a final note on usage, "mapping" may be used as either a noun or a verb. The usage context will make the distinction evident herein.

Malcom can be used in cases where the number of symbols is finite. Sequences composed of continuous valued data are not appropriate for Malcom analysis unless the continuous valued data is first quantized using a technique like vector quantization (Gray, R. (1984). Vector Quantization. *IEEE Acoustics, Speech, and Signal Processing Magazine*, 4–29, incorporated herein by reference).

Figure 1:
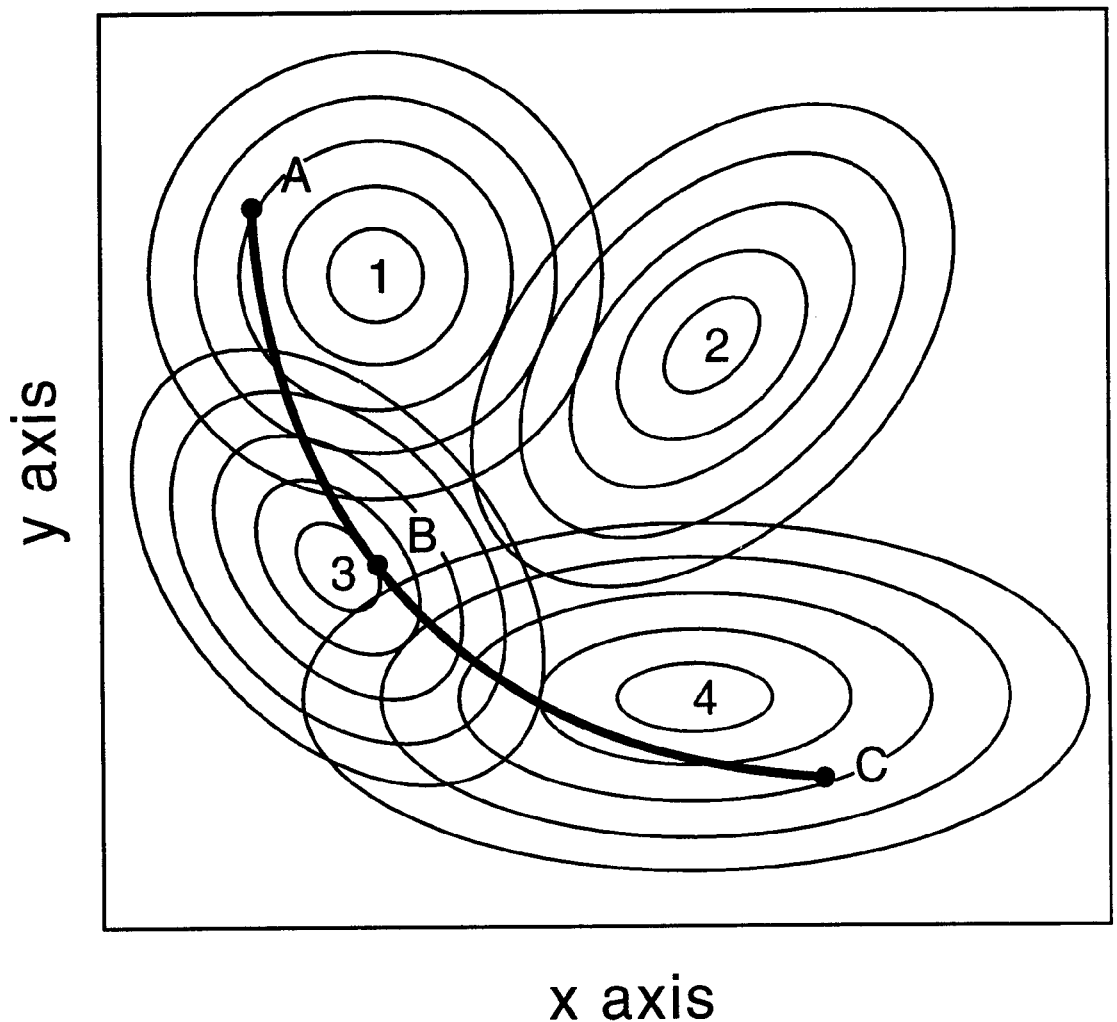
FIG. 1 graphically depicts a hypothetical example of a continuity map

Malcom uses a model of sequence generation in which sequences are produced as a point moves through an abstract space called a continuity map (CM). FIG. 1 shows a hypothetical continuity map that will be used to explain Malcom. The CM in FIG. 1 is characteristic of a CM used to determine sequences composed of symbols in the set $\{1, 2, 3, 4\}$, such as the sequence $\{1, 4, 4, 3, 2\}$. In FIG. 1, the set of concentric ellipses around a symbol, e.g., the number "2", are used to represent equiprobability curves of a probability density function (PDF). The PDF gives the probability that a symbol, e.g., "2", will be produced from any position in the CM. Similarly, the ellipses surrounding the symbol 1, 3, and 4, represent equiprobability curves of PDFs giving the probability of producing the symbols "1", "3", and "4", respectively, from any position in the CM.

For ease of exposition, let $L_{i1}$ represent the smallest ellipse centered around a number i, the next largest curve $L_{i2}$, etc. In the following discussion it will be assumed that the height of the PDF (on the z axis—not shown in the figure) of $L_{ij}$ is identical to the height of $L_{kj}$, i.e., the curve closest to "1" connects points with the same probability density as the points connected by the curve closest to "2", etc. It will also be assumed that the height of each PDF monotonically decreases radially outward from the center of the PDF.

Note that the CM axes are arbitrary in this case, and so are labeled simply "axis x" and "axis y". All that matters is the relative positions of the objects in the CM. In fact, reflection, translation or scaling of the positions of the objects in the CM will be an equally good CM.

From this map, it can be seen that the probability of producing symbol "1" from the point marked "A" is higher than the probability of producing "2", "3", or "4" from position "A", but that there is some probability of producing any one of the other symbols from position A. In general, every position in the CM will have some probability of producing each of the symbols, and each sequence of n positions (e.g., positions A, B, C) in the CM has some probability of producing any sequence of n symbols.

To find the conditional probability of a sequence of symbols using Malcom, the sequence of positions in the CM, i.e., the path through the CM, that maximizes the probability of the symbol sequence is found. The probability of producing the symbol sequence given the path is then used as the estimate of the conditional probability of the sequence.

If all paths through the CM were equally probable, then all sequences which differed only in the order of the symbols would be equally probable. To see why, note that the path which maximizes the probability of the sequence {1, 3, 4} goes (approximately) from the mode of the PDF for symbol "1", to the mode of the PDF for symbol "3", to the mode of the PDF for symbol "4". The path through the CM which maximizes the probability of the sequence {3, 1, 4} goes through the same points just in a different order. From this fact, it is possible to show that the probability of sequence {1, 3, 4} given the first path through the CM will be exactly equal to the probability of sequence {3, 1, 4} given the second path through the CM.

Since it is important to be able to represent the fact that symbol sequences differing in order may have different probabilities, Malcom constrains the possible paths through the CM. As the smooth curve connecting the points "A", "B", and "C" suggests, Malcom as currently embodied requires that pathsthrough the CM are smooth. This smoothness constraint could easily be replaced by other constraints if required (e.g. that the probability of a path goes down as the frequencies increase, or that the paths must all lie on a circle, etc.).

In order to determine the probability of a sequence, Malcom is used to adjust the parameters of the PDFs associated with the symbols in a manner that maximizes the probability of all the data sequences in a known training set. However, since the algorithm for adjusting the PDF parameters uses the technique for finding the path that maximizes the probability of the data, the following invention description will first discuss how the best path is found given a probabilistic mapping and a sequence of symbols, and then discuss how to make a maximum likelihood continuity mapping.

FINDING CONTINUITY MAP PATHS THAT MAXIMIZE THE PROBABILITY OF THE OBSERVED DATA

Figure 2A:
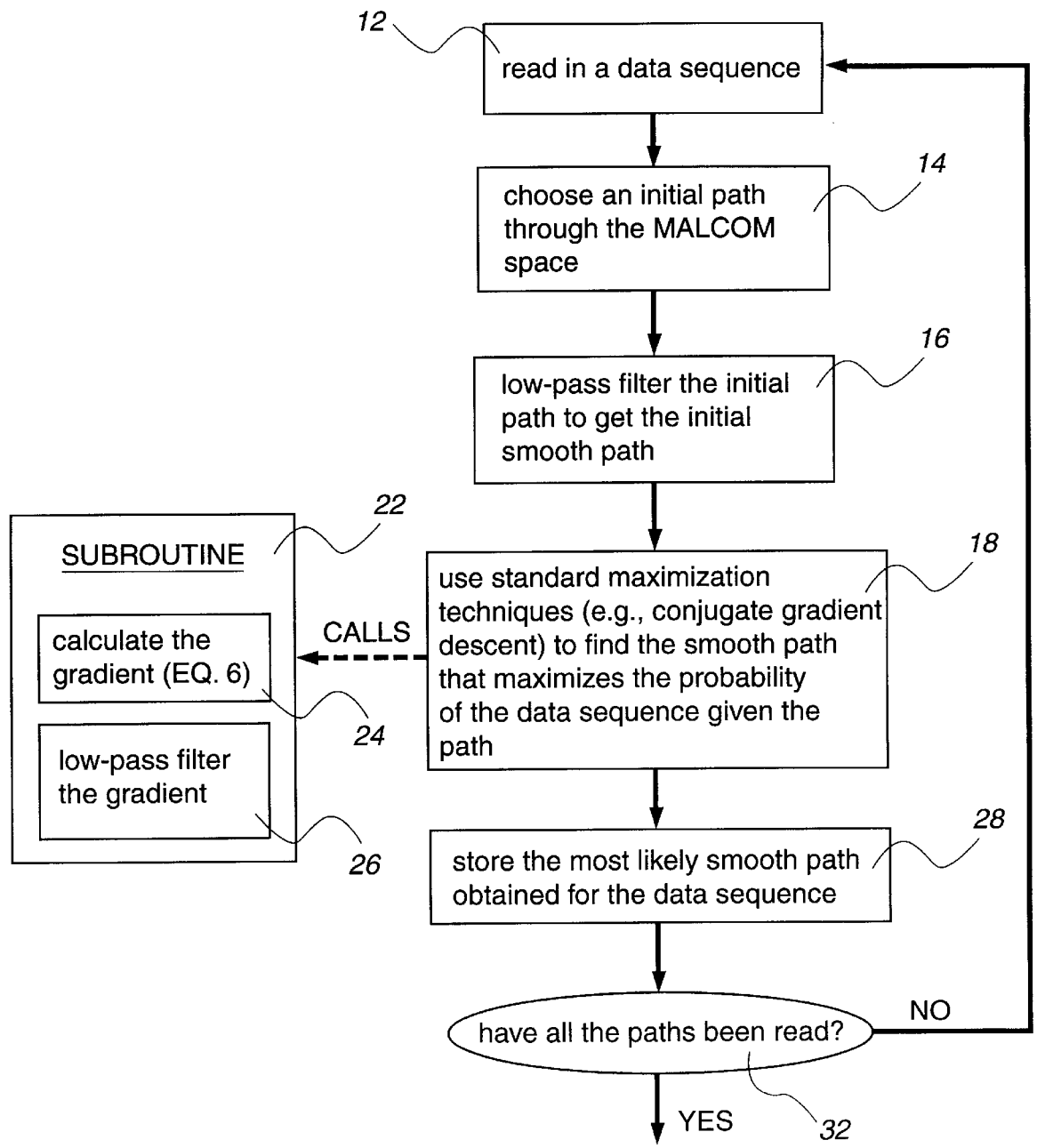
FIGS. 2A–E are flow charts that depict maximum likelihood continuity mapping according to the present invention.
Figure 2B:
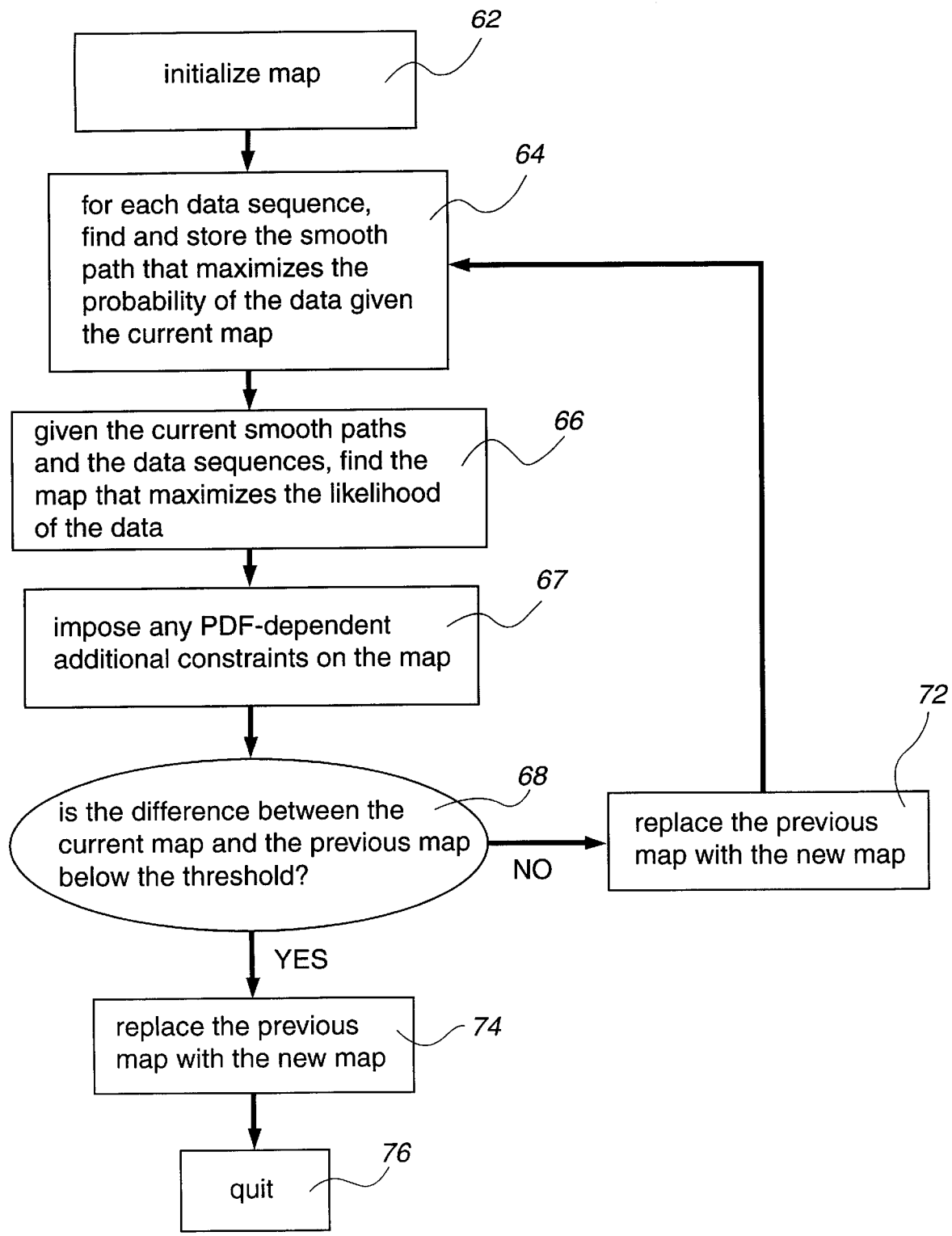

As discussed above, Malcom finds continuity map paths that maximize the conditional probability of a data sequence. This section and the flow charts shown in FIG. 2A and 2B show how to determine continuity map paths corresponding to symbol sequences.

The probability of a sequence of symbols given a continuity map path will be derived by first finding the probability of a single symbol given a single continuity map position, and then by combining probabilities over all the symbols in a sequence. Next, a technique for finding the continuity map path that maximizes the conditional probability of a symbol sequence will be described. Finally, the problem is constrained to find the smooth continuity map path (as opposed to any arbitrary continuity map path) that maximizes the conditional probability of the data.

The following definitions are used. Let:
c(t)=the $t^{th}$ symbol;
c=[c(1), c(2), . . . c(n)]=a sequence of symbols, where n is the number of symbols;
$x_i(t)$=the position at time t on dimension i of the continuity map;
x(t)=[$x_1(t)$, $x_2(t)$, . . . $x_d(t)$]=a vector giving the d-dimensional position in the continuity map at time t, where d is the dimensionality of the CM; and
X=[x(1), x(2), . . . x(n)]=a sequence of continuity map positions.

Further definitions are needed to specify the mapping between symbols and PDFs over continuity map positions. Let:
$P(c_i)$=the probability of observing symbol $c_i$ given no information about context;
$P(x|c_i, \phi)$=the probability that continuity map position x was used to produce symbol $c_i$,
where $\phi$=a set of PDF shape model parameters, e.g., $\phi$ could include the mean and covariance matrix of a Gaussian probability density function used to model the distribution of x given c.

Note that many different distributions of PDFs could be used for $P(x|c_i, \phi)$. For example, it may be necessary to specify $P(x|c_i, \phi)$ as a mixture of Gaussians.

With these definitions, the probability of observing symbol $c_j$, given that the continuity map position vector is x with PDF shape model parameters $\phi$, is determined using Bayes' Law as:

$$P(c_j | x, \varphi) = \frac{P(c_j, x | \varphi)}{P(x | \varphi)} = \frac{P(c_j, x | \varphi)}{\sum_i P(c_i, x | \varphi)} = \frac{P(x | c_j, \varphi) P(c_j)}{\sum_i P(x | c_i, \varphi) P(c_i)} \quad \text{Eq. 1}$$

The probability of the symbol sequence can be determined by assuming conditional independence, i.e.

$$P[c | X, \varphi] = \prod_{i=0}^{n} P[c(t) | x(t), \varphi] \quad \text{Eq. 2}$$

Conditional independence implies that the probability of producing a given symbol is wholly dependent on the current continuity map position without any regard to the previous continuity map positions. Note that the probability of observing a symbol is not assumed to be independent of the preceding and subsequent symbols; it is only assumed to be conditionally independent. So if x(t) is dependent on x(t') then c(t) is dependent on c(t'). By using an appropriately constrained model of possible continuity map paths the sequences of symbols can be tightly constrained.

The goal is to find the sequence of continuity map positions X that maximizes the conditional probability, $P(c|X,\phi)$, of a sequence of symbols, c. A succinct notation for writing "Let $\hat{X}$ be the X that maximizes $P(c|X,\phi)$ is:

$$\hat{X} = \underset{x}{\text{argmax}} P(c | X, \varphi) \quad \text{Eq. 3}$$

Function maximization is a useful process and many standard maximization algorithms already exist. While many of the standard algorithms could be used, the more efficient algorithms require calculating the gradient of the function to be maximized. Thus, the gradient with respect to X is derived here.

To simplify the problem of finding $\hat{X}$, note that the X that maximizes $P(c|X,\phi)$ also maximizes $\text{LogP}[c|X,\phi]$. Thus, $\text{LogP}[c|X,\phi]$ is maximized using the gradient of $\text{LogP}[c|X,\phi]$, which is denoted $\nabla \text{LogP}[c|X,\phi]$, to get the maximum likelihood estimate of the continuity map path that produced c.

This gradient is found by first taking the logarithm of Eq. 2:

$$\text{Log}P[c | X, \varphi] = \sum_t \text{Log}P[c(t) | x(t), \varphi] \quad \text{Eq. 4}$$

Next, substitute Eq. 1 into Eq. 4 and separate the terms in the logarithm to get:

$$\text{Log}P[c \mid X, \varphi] = \qquad \text{Eq. 5}$$

$$\sum_i \{\text{Log}P[x(t) \mid c(t), \varphi] + \text{Log}P[c(t)] - \text{Log}\sum_i P[x(t) \mid c_i, \varphi]P[c_i]\}$$

The gradient of equation 5 is:

$$\nabla \text{Log}P[c \mid X, \varphi] = \frac{\nabla P[x(t') \mid c(t'), \varphi]}{P[x(t') \mid c(t'), \varphi]} - \frac{\sum_i P[c_i] \nabla P[x(t') \mid c_i, \varphi]}{\sum_i P[x(t') \mid c_i, \varphi]P[c_i]} \qquad \text{Eq. 6}$$

The preceding analysis is general because it ignores constraints on the possible continuity map paths. Herein, "smooth" is taken to mean constrained in some way, e.g., being bandlimited, falling on a hypersphere, or the like. To incorporate an exemplary smoothness constraint on continuity map motion, only those continuity map paths are allowed that have all their energy in Fourier components below some cut-off frequency $f_c$ (say 15 Hz). Realizing that a discrete Fourier transform can be considered a rotation to an new set of orthogonal basis vectors, the constraint that the continuity map path have all of its energy below the cut-off frequency $f_c$ is equivalent to requiring that the path lie on a hyperplane composed of the axes defined by low frequency sine and cosine waves.

From vector calculus, when $\nabla \text{Log}(c \mid X, \phi)$ is perpendicular to the constraining hyperplane, i.e., has no components below a cut-off frequency, so that $\text{Log}(c \mid X, \phi)$ can not increase without X traveling off the hyperplane, then a constrained local minimum has been reached. Thus, the smooth path that maximizes the probability of the observed data is the path for which $\nabla \text{Log}(c \mid X, \phi)$ has no components with energy below the cut-off frequency. This suggests the following process for finding the smooth path that maximizes the probability of the data, as shown in FIG. 2A:

1) read 12 a data sequence (a sequence of symbols);

2) initialize the maximization algorithm by choosing 14 a continuity map path and low-pass filtering 16 the initial path selected.

3) use standard maximization techniques 18 (e.g., conjugate gradient descent in conjunction with subroutine 22 that calculates 24 the gradient using Eq. 7 and low-pass filters 26 the gradient) to find the smooth path that maximizes the probability of the data given the path;

4) let the maximization algorithm converge 18 to a solution;

5) store 28 the most likely smooth path obtained for the data sequences:

6) repeat 32 steps 12–28 until all of the paths have been read.

A NOTE ON INITIALIZATION

While, theoretically, any smooth path could be used to initialize 14 the maximization algorithm, a solution can be found more quickly if a good initial smooth path can be found. In fact, for many classes of distributions of $P(x \mid c_i, \phi)$ a good initial path can be found. To find a good initial path, assume the symbol sequence [5, 2, . . . ]. A path is created by using the mean continuity map position associated with symbol 5 as the first point in the path, then the mean continuity map position associated with symbol 2 as the second point in the path, etc. Finally, the path is low-pass filtered to ensure that it is smooth.

A NOTE ON LOW-PASS FILTERING

Since it may not be clear what is meant by low-pass filtering a multidimensional path, the goal of this section is to describe this operation in more detail. A way to filter paths is described which will give the same low pass-filtered results regardless of rotations, reflections, or translations of the paths. Consider that, in a path through a d-dimensional space, there are d measurements at each time. It can be shown that low-pass filtering the time series composed of $[x_1(1), x_1(2), \ldots x_1(n)]$ and then low-pass filtering the path composed of $[x_2(1), x_2(2), \ldots x_2(n)]$, etc., until the path has been low-pass filtered on each dimension, will force the path to be low-pass filtered regardless of any rotation, reflection, or scaling of the CM. This result follows because any linear combination of signals having no energy in Fourier components above $f_c$ will have no energy in Fourier components above $f_c$ and rotation, reflection, and scaling are all linear operations.

However, in the hypothetical continuity map shown in FIG. 2, the x-axis components of the path [A,B,C] increase in value from time 1 to time 3, but the CM could easily be rotated and translated so that the x-axis component of the path at times 1 and 3 are 0 and the x-axis component of the path at time 2 is some positive value. This fact affects how the low-pass filtering is performed, because discrete-time filtering theory assumes that the paths are periodic—after the last element of the time series, the series is assumed to restart with the first element of the time series. Thus, by performing simple rotations and translations of the CM, time series are obtained that have large discontinuities or are relatively smooth.

To avoid problems that would arise from the discontinuities, the trend or bias of the time series is removed before smoothing the paths and then is added back after the filtering has been performed, i.e., the line connecting the first and last points in the path should be subtracted from the path before filtering and added back after filtering. The trend should also be removed before filtering the gradient and then added back after filtering the gradient.

Figure 2C:
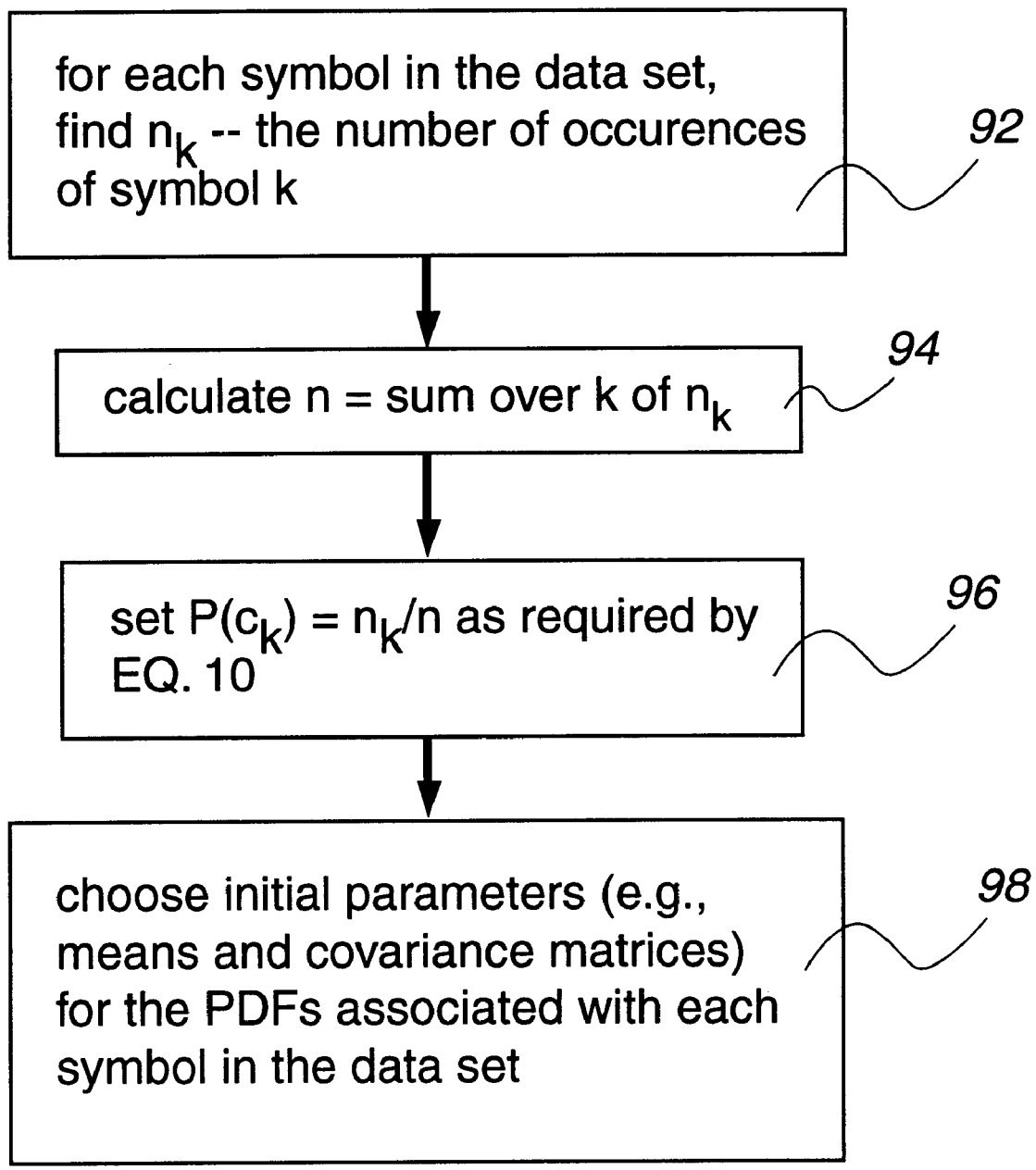
Figure 2D:
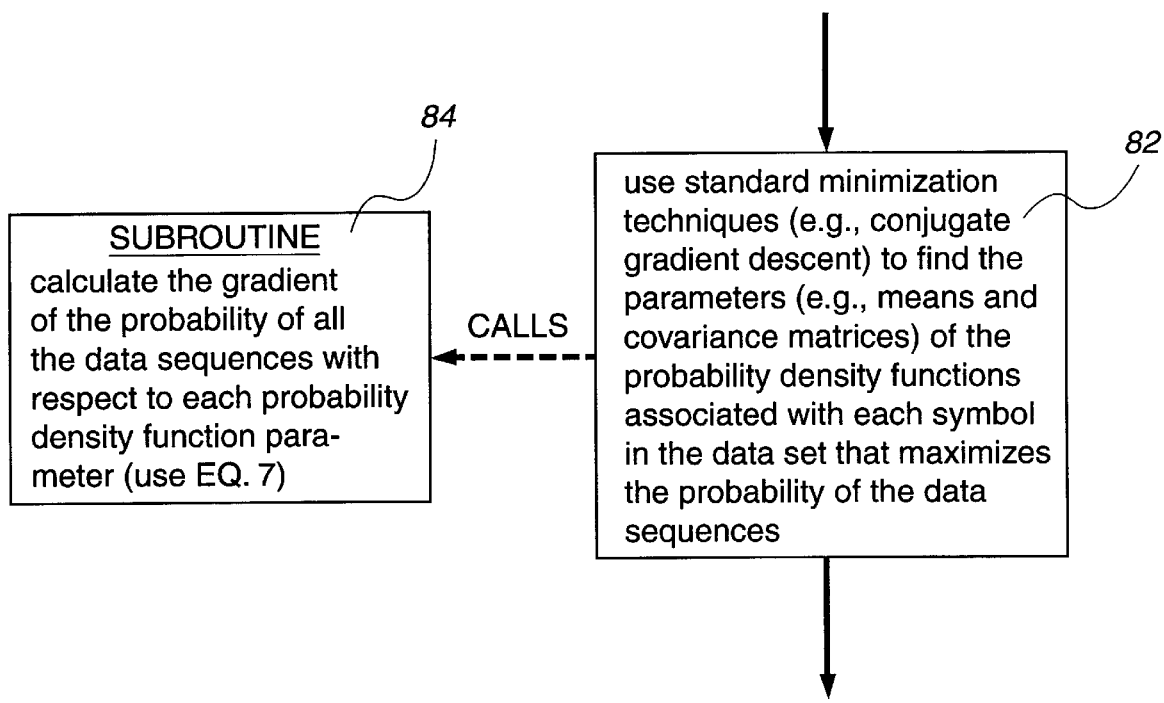
Figure 2E:
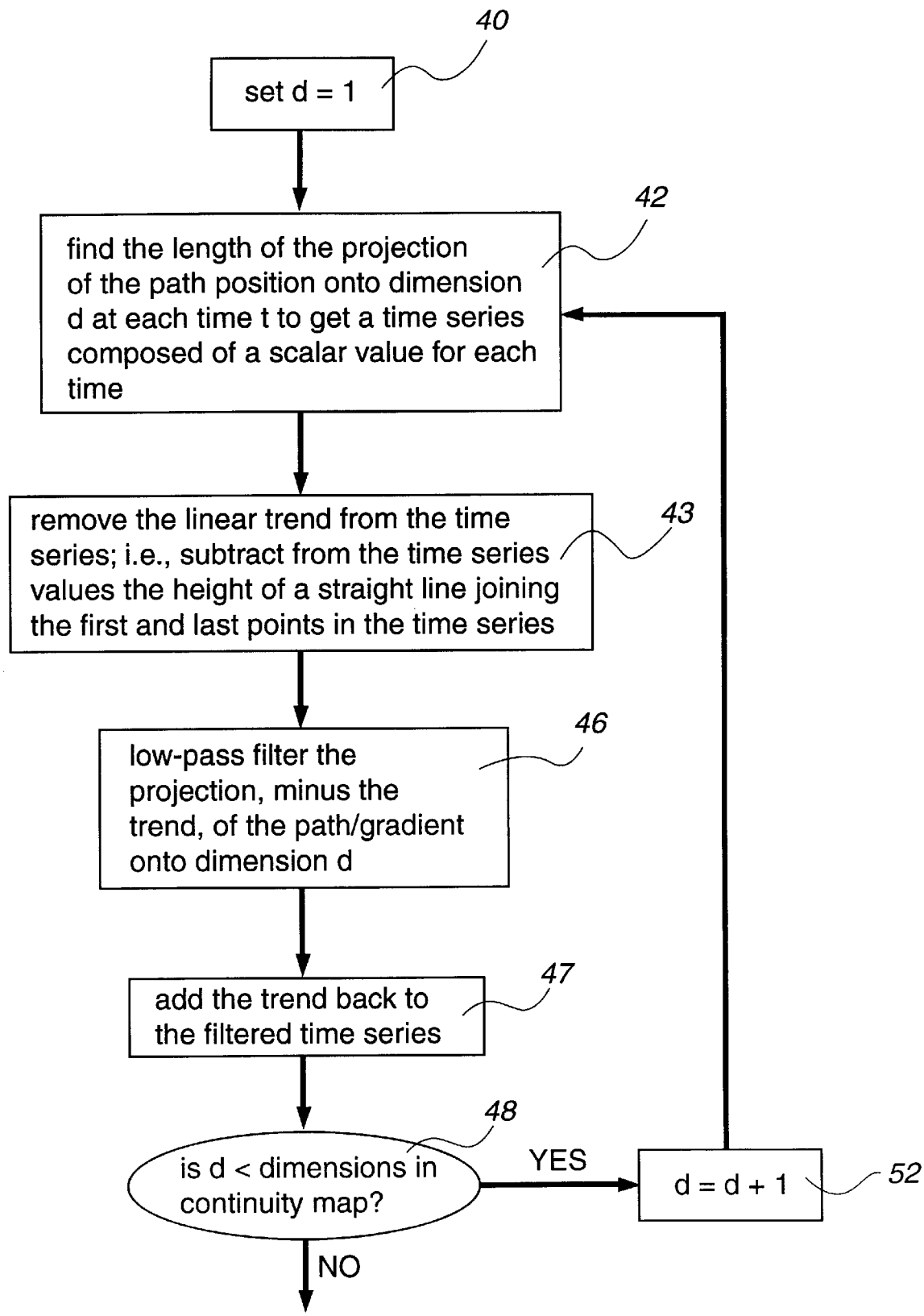

These steps are depicted in the flow chart in FIG. 2E and comprise the low-pass filter process of steps 16, 26 (FIG. 2A):

1) select 40 a first dimension (set d=1);

2) project 42 a path/gradient onto dimension d to find the length of the projection of the path position onto dimension d at each time to get a time series composed of a scalar value of each time;

3) remove 43 the trend of the projected path/gradient, i.e., subtract from the time series values the height of a straight line joining the first and last points in the time series;

4) low-pass filter 46 the projection, less the trend, of the path/gradient onto dimension d;

5) add 47 the trend back to the path/gradient 6) determine 48 if dimensions remain;

7) if so, increment 52 to the next dimension and repeat; if not, complete the process.

FINDING A MAPPING BETWEEN SYMBOLS AND CONTINUITY MAP POSITIONS

In the preceding sections, it was assumed that P(c) and $P(x \mid c, \phi)$ are known. In this section it is shown that these values can be determined using only symbol sequences. This is an important aspect of the present invention, because $P(x \mid c, \phi)$ is a probabilistic mapping from symbols to continuity map positions, and, in accordance with the present invention, this mapping is inferred using training data composed of only sequences of symbols.

The process of finding the mapping between symbol sequences and continuity map positions is presented in the flow charts shown in FIGS. 2A–2E. FIG. 2B shows the steps needed to learn the mapping:

1) given a collection of symbol sequences and some initial estimate 62 of the mapping between symbols and PDFs over continuity map positions, use the procedures described herein to find the smooth paths 64 (see FIG. 2A) (one path per sequence) that maximize the conditional probability of the observed data, i.e., for each sequence find:

$$\hat{X} = \underset{x}{\operatorname{argmax}} P(c \mid X, \varphi)$$

where $\hat{X}$ is constrained to be smooth;

2) given the smooth paths that maximize the probability of the data sequences, find 66 the PDF parameters, $\phi$ (FIG. 2D) and $P(c_i)$ (FIG. 2C) values, that maximize (or at least increase) the conditional probability of the data set, i.e., find:

$$\hat{\varphi} = \underset{\varphi}{\operatorname{argmax}} \prod_c P(c \mid \hat{X}, \varphi)$$

and $$\hat{P}(c_i) = \underset{\hat{P}(c_i)}{\operatorname{argmax}} \prod_c P(c \mid \hat{X}, \varphi)$$

where the products are taken over all data sequences. As discussed below, the $P(c_i)$ values are calculated from the number of each symbol in the data set. An implication of this is that the $P(c_i)$ values that maximize the conditional probability of the data do not change, and so can be calculated once, at the beginning of the algorithm, as part of the initialization 92–96.

3) Impose 67 on $\phi$ any PDF-dependent additional constraints needed for the particular probability density function used;

4) determine 68 the difference between the values from step 67 and current values;

5) if the difference is not below a threshold difference, replace 72 the previous $\phi$ with the new $\phi$ and repeat steps 64–67 iteratively until a local (possibly global) probability maximum is reached;

6) the $\phi$ that is a local maximum is then stored 74 and the process is completed 76.

Calculation of $\phi$ can be accomplished using standard maximization algorithms. Since maximization algorithms that use gradient information are typically faster than algorithms that do not use the gradient, we derive an expression for $\nabla \text{Log}(c|X,\phi)$ with respect to $\phi$ to aid in maximizing the probability of the data:

$$\nabla \text{Log}P[c \mid X, \varphi] = \nabla \sum_i \left\{ \text{Log}P[x(t) \mid c(t), \varphi] + \text{Log}P[c(t)] - \text{Log}\sum_i P[x(t) \mid c_i] P[c_i] \right\}$$

$$= \sum_i \left\{ \frac{\nabla P[x(t) \mid c(t), \varphi]}{P[x(t) \mid c(t), \varphi]} + \frac{\nabla P[c(t)]}{P[c(t)]} - \frac{\sum_i \nabla \{P[x(t) \mid c_i, \varphi] P[c_i]\}}{\sum_i P[x(t) \mid c_i, \varphi] P[c_i]} \right\}$$

concluding with:

$$\nabla \text{Log}P[c \mid X, \varphi] = \sum_i \left\{ \frac{\nabla P[x(t) \mid c(t), \varphi]}{P[x(t) \mid c(t), \varphi]} - \frac{\sum_i \nabla \{P[x(t) \mid c_i, \varphi] P[c_i]\}}{\sum_i P[x(t) \mid c_i, \varphi] P[c_i]} \right\} \quad \text{Eq. 7}$$

FIG. 2D illustrates a process using standard techniques 82 (e.g., conjugate gradient) to find the parameters (e.g., means and covariance matrices) of the probability density functions (PDF) associated with each symbol in the data set that maximized the probability of the data. Subroutine 84 calculates the gradient of the probability of all the data sequences with respect to each probability density function parameter using Eq. 7.

The P(c) values that maximize the probability of the symbol sequences can be found analytically. To derive the P(c) values, start with the expression for $\nabla \text{Log}(c|X,\phi)$ with respect to $P(c_k)$:

$$\nabla \text{Log}P[c \mid X, \varphi] = \sum_{t \in c(t) = c_k} \frac{1}{P[c_k]} - \sum_{t=0}^{n} \left\{ \frac{P[x(t) \mid c_k, \varphi]}{\sum_i P[x(t) \mid c_i, \varphi] P[c_i]} \right\} \quad \text{Eq. 8}$$

$$= \frac{n_k}{P[c_k]} - \sum_{t=0}^{n} \left\{ \frac{P[x(t) \mid c_k, \varphi]}{\sum_i P[x(t) \mid c_i, \varphi] P[c_i]} \right\}$$

$$= \frac{n_k}{P[c_k]} - \frac{1}{P(c_k)} \sum_t P[c_k \mid x(t), \varphi]$$

$$\cong \frac{n_k}{P[c_k]} - \frac{1}{P(c_k)} \sum_x P(x) P[c_k \mid x, \varphi]$$

$$= \frac{n_k}{P[c_k]} - 1$$

where $n_k$ is the number of times $c_k$ is observed in the speech sample. Since the sum of the P(c) values must be 1, finding the P(c) values that maximize the conditional probability of the data is a constrained optimization problem in which the P(c) values are found by using a Lagrange multiplier, $\lambda$, and solving:

$$\frac{n_k}{P(c_k)} - 1 = \lambda \nabla \sum_i P(c_i) = \lambda \quad \text{Eq. 9}$$

From Eq. 9, it can be seen that setting $$P(c_k) = n_k/n \quad \text{Eq. 10}$$

will maximize the conditional probability of the data.

Initial parameters are established as shown in FIG. 2C. For each symbol k in the data set, the number of occurrences, $n_k$ is found 92 for that symbol. Then, n=(sum over k of $n_k$) is calculated 94. The probability $P(c_k)=n_k/n$ of each symbol is set 96 (Eq. 10) and an initial set of parameters (e.g., means and covariance matrices) is chosen 98 for the PDF's associated with each symbol in the data set. This establishes the initial map 62 for use in the process shown in FIG. 2B.

Thus, using only symbols, it is possible to infer a probabilistic mapping between symbols and continuity map positions. Furthermore, given symbols and the probabilistic mapping (or a probabilistic mapping created by a different method), it is possible to find the continuity map trajectories most likely to have created the symbols.

A NOTE ON PDF-DEPENDENT CONSTRAINTS

For most forms of the $P(x \uparrow c, \phi)$ distributions, there are many different $\phi$ values that will give equally high values of P(c|X,φ). Some of these solutions are degenerate and should be avoided. Examples of simple constraints that can be applied when using Gaussian distributions are discussed in the example derivation below.

CHOOSING THE DIMENSIONALITY AND CUT-OFF FREQUENCY

Even though the probability of the data increases as the dimensionality and/or cut-off frequency of the Malcom solution increase, it clearly is not the case that increasing the dimensionality or cut-off frequency will always give a better solution. While the choice of the dimensionality and cut-off frequency depend in part on the application, one aid to choosing these parameters is the number of bits needed to transmit the symbol sequences. The number of bits needed to transmit the symbol sequences is the sum of the number of bits needed to transmit the smooth paths and the number of bits needed to transmit the symbols given the smooth paths. It is known from information theory that the number of bits needed to transmit the symbols given the smooth paths is $$-\sum_i Log P[c(t) | x(t), \varphi].$$

Notice that the number of bits needed to transmit the smooth paths increases with increasing dimensionality and cut-off frequency (since the number of samples per second increases), whereas the number of bits needed to transmit the data given the smooth paths decreases with increasing dimensionality and cut-off frequency. Thus, the number of bits needed to transmit the data better captures the trade-off between parsimony and accuracy.

EXAMPLE

The above derivation permits many different forms of the P[x(t)|c(t),φ] distributions to be used. In this section the gradient equations are derived for the exemplary case where the distribution of continuity map positions that produce symbol c is a multivariate Gaussian characterized by the equation:

$$P[x | c, \varphi] = \frac{1}{(2\pi)^{\frac{d}{2}} |\sigma(c)|^{\frac{1}{2}}} \exp\left\{-\frac{1}{2}[x - \mu(c)]^t \sigma^{-1}(c)[x - \mu(c)]\right\} \quad \text{Eq. 11}$$

where:

d is the number of dimensions in the continuity map, $\mu(c)$ is a vector giving the mean of all the continuity map positions associated with symbol c, where $\mu_i(c)$ is the $i^{th}$ component of the $\mu(c)$, σ(c) is the covariance matrix of the multivariate Gaussian distribution of continuity map positions that produce symbol c, and x is a vector describing a continuity map configuration.

As mentioned above, the x, $\mu(c)$ and σ(c) values that maximize the conditional probability of the data are not unique. For example, suppose x, $\mu(c)$, and σ(c) maximize the conditional probability of the data. Let R be an arbitrary matrix and let y be an arbitrary vector. Also let x'=Rx+y, $\mu'(c)=R\mu(c)+y$, and σ'(c)=Rσ(c)R$^t$ then the probability of x' given a symbol and the model is $$P[x' | c, \varphi'] = \frac{1}{|R|} P[x | c, \varphi] \quad \text{Eq. 12}$$

Notice that the probability is only changed by a scaling factor and goes to infinity as the determinant of R goes to 0. Furthermore, if Eq. 12 is substituted into Eq. 1, it can be seen that the conditional probability of the symbols is the same for x', $\mu'(c)$ and σ'(c) as it was for x, $\mu(c)$ and σ(c). Thus, an infinite number of solutions will all be equally good if there are no additional constraints placed on the solutions. Among the solutions that are equally good are rotations, reflections, translations, and scaling of the configuration of $\mu(c)$ values. While rotations, reflections, scaling, and translations of the solutions are inconsequential, numerical difficulties can occur if the determinant of R goes to zero. For this reason, it is a good idea to place additional constraints on the solution to prevent degenerate solutions.

There are a variety of simple constraints that can be used to prevent degenerate solutions. In this discussion, the x, $\mu(c)$ and σ(c) values are taken as the "correct" values that correspond to quantities in the underlying symbol production system and x', $\mu'(c)$ and σ'(c) will be taken to be the estimated values obtained by Malcom. One way to constrain the solutions is to require σ'(c) to be the identity matrix for at least one value of c. This forces R=σ$^{-\frac{1}{2}}$(c), which is sufficient to prevent the determinant of R from being 0 as long as σ(c) has full rank.

Alternately, since the constraint on σ'(c) is not guaranteed to prevent a degenerate solution, a constraint on the $\mu'(c)$ values can be used. For example, if $v_i = [\mu'_i(c_1) \; \mu'_i(c_2) \ldots \mu'_i(c_m)]$, where i indexes the components of the $\mu'(c)$ vector and m is the number of symbols in the vocabulary (i.e., the number of distinct symbols), then R can be forced to have full rank by first forcing the components of each $v_i$ to sum to 0 by subtracting the mean of the components from each component, then by using Gram-Schmidt orthogonalization to force the $v_i$ to be mutually orthogonal, and finally scaling the $v_i$ to all be length 1. If these steps are performed after each re-estimation of φ, the solutions will only differ by rotations and reflections, which are irrelevant. Of course, combinations of constraints can also be used. While using combinations of constraints will overconstrain the solution, it will also decrease the number of parameters that need to be estimated and thereby potentially lead to better solutions with limited data sets.

Returning to the problem of finding the gradient equations for the Gaussian probability density function, let $\overline{\nabla}$ denote the gradient with respect to the components of x, so $$\overline{\nabla} P[x|c,\varphi] = -P[x|c,\varphi] \sigma^{-1}(c)[x-\mu(c)], \quad \text{Eq. 13}$$

which can be substituted into Eq. 6 to aid in finding the path that maximizes the conditional probability of the data:

$$\overline{\nabla} Log P[c | X, \varphi] = -\sigma^{-1}[c(t')]\{x(t') - \mu[c(t')]\} + \frac{\sum_i P[c_i] P[x(t') | c_i, \varphi] \sigma^{-1}(c_i)\{x(t') - \mu(c_i)\}}{\sum_i P[x(t') | c_i, \varphi] P[c_i]} \quad \text{Eq. 14}$$

Similarly, the gradient with respect to $\mu(c_k)$ is:

$$\nabla P[x \mid c_i, \varphi] = P[x \mid c_i, \varphi]\sigma^{-1}(c_i)[x - \mu(c_i)]\delta_{ik} \quad \text{Eq. 15}$$

$$\delta_{ik} = \begin{cases} 1 & \text{if } i = k \\ 0 & \text{if } i \neq k \end{cases}$$

Which, finally can be substituted into Eq. 7 to get:

$$\nabla \text{Log} P[c \mid X, \varphi] = \sum_{t \in c(t) = c_k} \sigma^{-1}[c(t)]\{x(t) - \mu[c(t)]\} - \quad \text{Eq. 16}$$

$$\sum_i P[c_k]P[x(t) \mid c_k, \varphi]\sigma^{-1}(c_k) \frac{\{x(t) - \mu(c_k)\}}{\sum_i P[x(t) \mid c_i, \varphi]P[c_i]}$$

PRELIMINARY STUDIES

Preliminary studies have demonstrated that a simplification of Malcom (Malcom 1) is able to learn a model of medical procedure sequences well enough to allow fraud detection. The simplifications in Malcom 1 significantly decrease training time when trying to learn the CM, but do not completely maximize the probability of the data.

ESTIMATING THE TRAINING DATA POSITIONS USING MALCOM I

Instead of maximizing the conditional probability of the observed data, Malcom 1 creates a CM by maximizing the probability of the smooth CM paths. Mathematically, this amounts to ignoring the second term in Eqs. 14 and 16. The simplified versions of Eqs. 14 and 16 are, respectively:

$$\nabla \text{LogP}[c|X,\phi] = -\sigma^{-1}[c(t')]\{x(t') - \mu[c(t')]\} \quad \text{Eq. 17}$$

and $$\nabla \text{Log} P[c \mid X, \varphi] = \sum_i \sigma^{-1}[c(t)]\{x(t) - \mu[c(t)]\} \quad \text{Eq. 18}$$

Notice that Eq. 18 is significantly simpler to maximize than Eq. 16. Eq. 16 requires an iterative maximization algorithm whereas Eq. 18 can be solved analytically. The analytic solution for Eq. 18 is to set $$\mu(c_i) = \sum_{t \in c(t) = c_i} x(t) \bigg/ n_i \quad \text{Eq. 19}$$

P(c) was calculated using Eq. 10. To estimate the conditional probability of the data, the most probable path was found (as opposed to the most likely path, which would be the path that maximizes the conditional probability of the data) and the likelihood of the symbol sequences given the most probable path was calculated.

The degeneracy problem is much worse when using Malcom 1 than it is when using Malcom. The problem is worse because Malcom 1 maximizes the probability of the smooth paths, and, as discussed above, these probabilities go to infinity as the determinant of R goes to 0. Thus, without imposing constraints, Malcom 1 will return degenerate solutions if allowed to run indefinitely. In the following description, all the covariance matrices were constrained to be identity matrices and the means were constrained with centering, orthogonalizing, and scaling, as discussed above.

PRELIMINARY STUDY

In an anomaly/fraud detection experiment, Malcom 1 was used to detect fraud in data composed of sequences of medical procedures, such as are available at large medical insurance companies or the various medical social services. In such data, a sequence of medical procedures (the patient's medical history) is associated with each patient. As already mentioned, such data contains information that can be used to determine whether some sequences of medical histories are unusual. If a patient's medical history is sufficiently anomalous, the patient's medical history or the physician's record may be further reviewed for evidence of fraud.

To use Malcom 1 for fraud detection, a continuity map (CM) is created to model typical treatment sequences. To do this, each medical procedure is represented by an appropriate probability density function (PDF) in a CM, analogous to what was depicted in FIG. 1. Any position in the CM space can be loosely thought of as describing *a priori* knowledge about the patient's health as measured in several ways, e.g. one axis might correspond to the health of the patient's musculoskeletal system, one axis might correspond to the health of the patient's cardiovascular system, etc.; however, the dimensions of the space are determined by the algorithm, not by preconceived notions of how health should be represented. The PDF's can be used to determine the likelihood that a patient is at some position in the CM (hereafter called the "health space") given a sequence of procedure codes, or to find the probability of a sequence of procedure codes given a path through the health space.

The main assumption underlying Malcom is that the paths through the CM are smooth, i.e. the health of the patient changes relatively slowly, getting gradually worse, and then, hopefully, getting gradually better. While this is not always the case, accommodations can be made for sudden changes in health, such as breaking a leg.

After the mapping between the Malcom 1 health space and the procedure codes is determined, Malcom 1 can be used to determine the conditional probability of another patient's medical history, and unlikely patient histories can be further examined for evidence of fraud.

A preliminary experiment suggests that the probabilities that Malcom 1 assigns to a medical history are better indicators of fraud than probabilities assigned without taking treatment order into account. After training on a relatively small data set composed of 1,944 patient histories, Malcom was used to score and rank 28,785 different patient medical histories. Each medical history was scored by dividing the conditional probability of the history by the number of symbols in the history—thus accounting for differences in sequences length. The lower the average conditional probability of a history, the worse the ranking. The medical histories were also ranked by evaluating the probability of each individual treatment without taking into consideration the order of the treatments and dividing by the number of symbols in the history (this technique is called the context-free model).

Of the 28,785 medical histories in the testing set, 19 were known to be anomalous. When the Malcom 1 rankings of the 19 anomalous medical histories were compared to the context-free model rankings, Malcom 1 ranked the known anomalous medical histories as more anomalous than the 0th order model. Approximately ⅔ of the 19 known anomalous medical histories were ranked in the worst 1% by Malcom, but less than half of the anomalous medical histories were ranked in the worst 1% for the 0th order model. To find the same number of anomalous medical histories using the context-fee model, nearly twice as many medical histories would have to be evaluated. The important conclusion is that Malcom can save time spent finding fraud because fewer medical histories need to be evaluated to find fraud with Malcom than if the treatment order is not taken into consideration.

In a preferred embodiment of Malcom, Malcom 1 may be used to initialize the Malcom procedure for finding the mapping between symbols and PDFs over the continuity map.

The foregoing description of anomaly detection has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to medical fraud detection to thereby enable others skilled in the art to best utilize the invention in various embodiments and with various modifications as are suited to the particular use contemplated. It is intended that the scope of the invention be defined by the claims appended hereto.

What is claimed is:

1. A computer-implemented method for detecting anomalous medical procedures comprising the steps of:

finding a mapping between model medical procedures forming model medical treatment sequences and probability density functions (PDFs) over continuity map (CM) positions in a health space, wherein each PDF quantifies the probability of positions in the CM given the associated model medical procedure;

inputting a new sequence of medical procedures to be reviewed;

finding a path through said continuity map that maximizes the conditional probability of said new sequence of medical procedures; and identifying anomalous medical procedures as any sequence of medical procedures with a conditional probability of the sequence of medical procedures given the path below a threshold value.

2. A method according to claim 1, wherein said step of finding said mapping further includes the steps of:

(a) forming a first estimate of said mapping between said model medical procedures and locations and shapes of said PDFs on said CM;

(b) determining for each sequence of said model medical procedures a smooth path through said CM that maximizes the probability of said each model medical treatment sequence;

(c) adjusting said locations and said shapes of said PDFs to increase the probability of said each model medical treatment sequence to form a new estimate of said mapping; and (d) repeating steps (b)–(c) until the difference in said locations and said shapes of said PDFs between successive ones of said mapping is below a selected threshold.

3. A method according to claim 2, wherein the step of determining each said model path on said CM further includes the steps of:

inputting a sequence of model medical procedures forming the model medical treatment sequence;

choosing a trial path on said CM;

adjusting the trial path to meet smoothness constraints on the model medical treatment sequence to get a constrained path;

adjusting said constrained path to maximize the probability of obtaining said model medical treatment sequence.

4. A computer-implemented method for identifying anomalous transactions comprising the steps of:

finding a mapping between model events forming model transactions and probability density functions (PDFs) over continuity map (CM) positions, wherein each PDF quantifies the probability of positions on the CM given the associated model event;

inputting a new event sequence forming a new transaction to be reviewed;

finding a path through said continuity map that maximizes the conditional probability of said new event sequence; and identifying anomalous transactions as any sequence of events with a conditional probability of the sequence of events below a threshold.

5. A method according to claim 4, wherein said step of finding said mapping further includes the steps of:

(a) forming a first estimate of said mapping between said transaction model events and locations and shapes of said PDFs on said CM;

(b) determining for each sequence of said model events a path through said CM that maximizes the probability of said each transaction;

(c) adjusting said locations and said shapes of said PDFs to increase the probability of said each transaction to form a new estimate of said mapping; and (d) repeating steps (b)–(c) until the difference in said locations and said shapes of said PDFs between successive ones of said mapping is below a selected threshold.

6. A method according to claim 5, wherein the step of determining each said model path on said CM further includes the steps of:

inputting a model event sequence;

choosing a trial path on said CM;

adjusting the trial path to meet selected smoothness constraints on the transaction to get a constrained path; and adjusting said constrained path to maximize the probability of obtaining said transaction.

\* \* \* \* \*